United States Patent Office 3,275,163
Patented Sept. 27, 1966

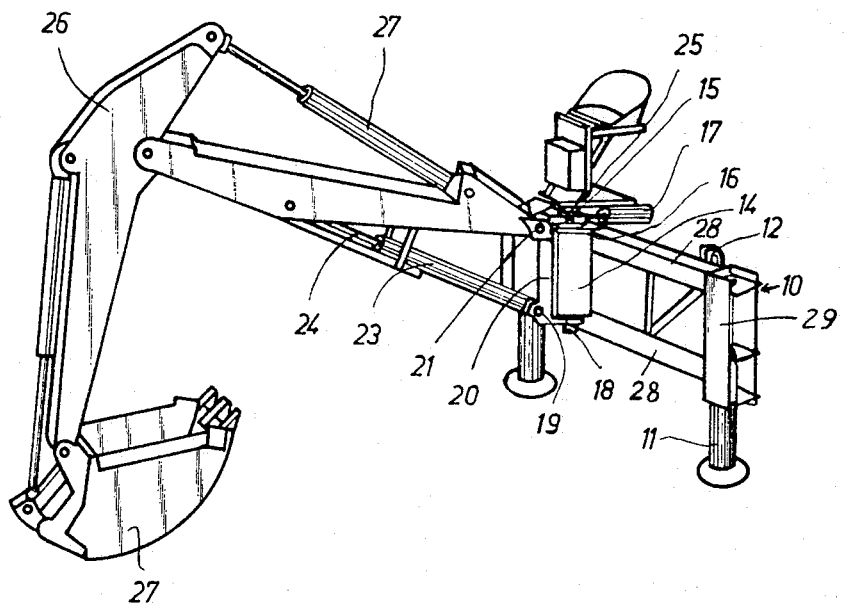

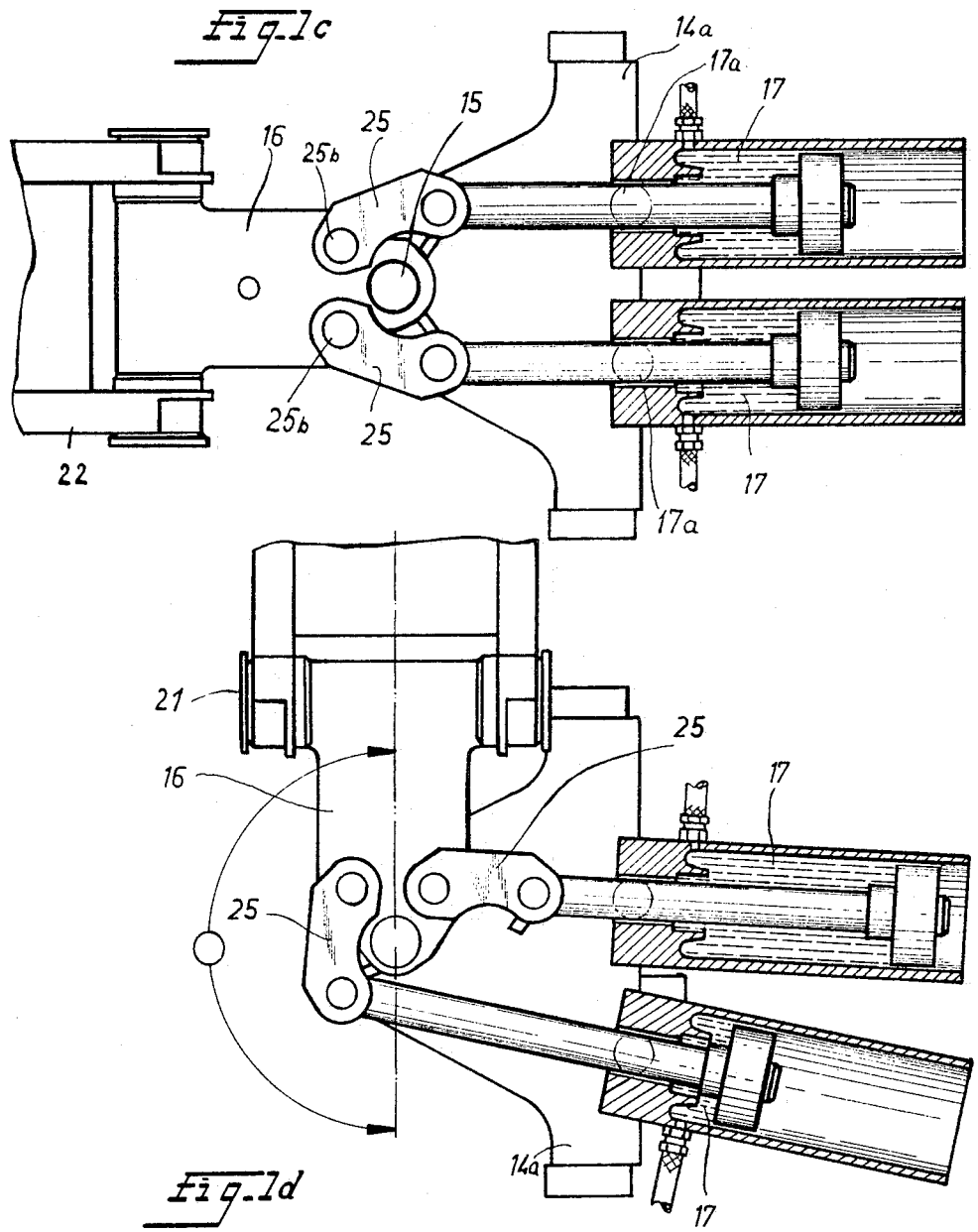

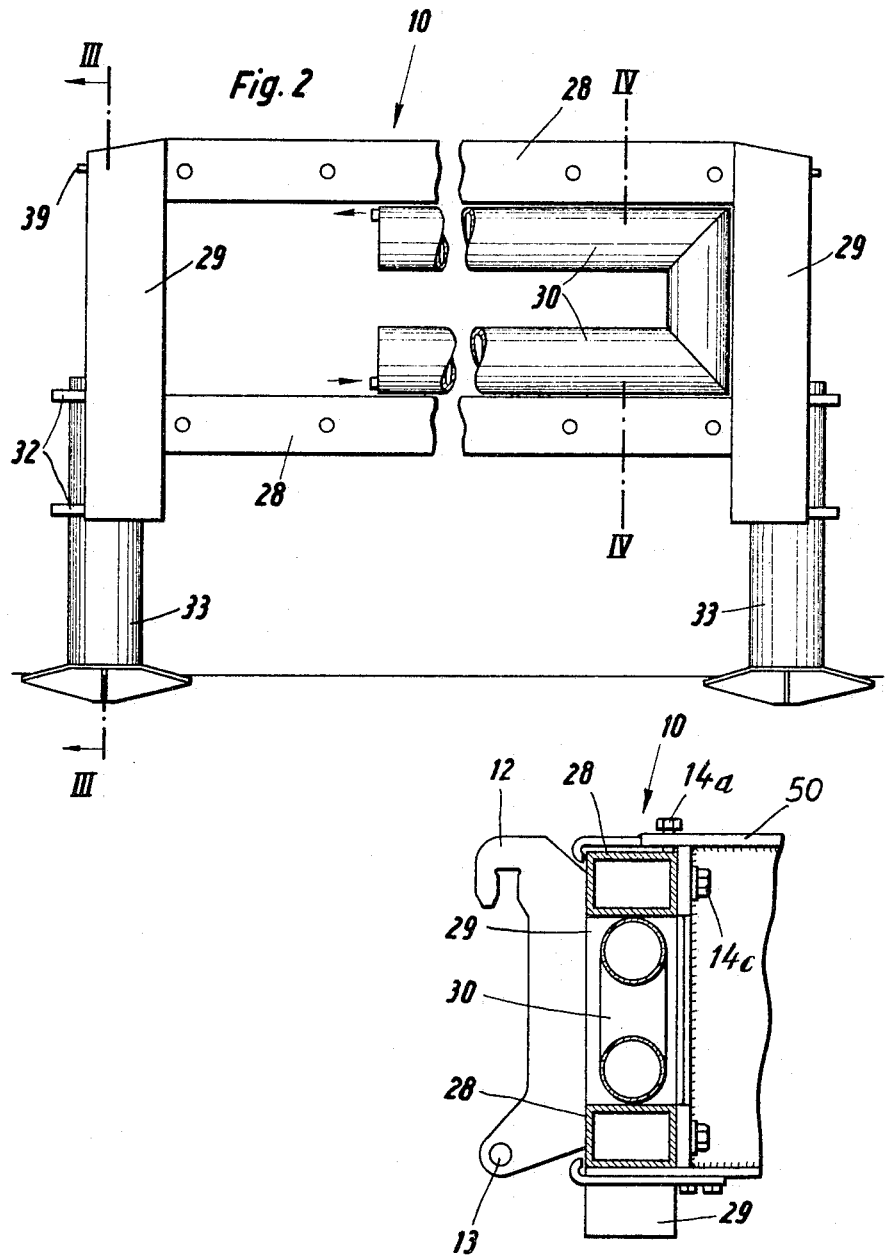

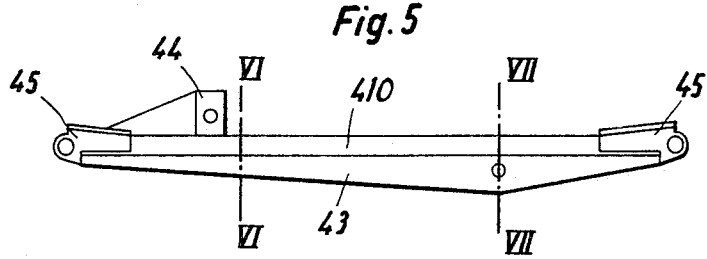
Fig. 5
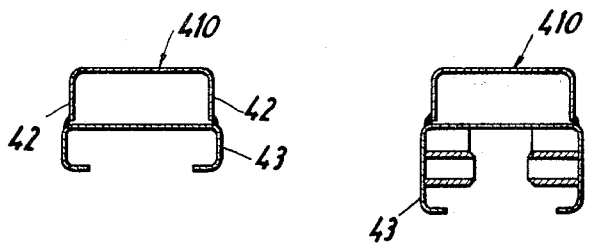
Fig. 6    Fig. 7
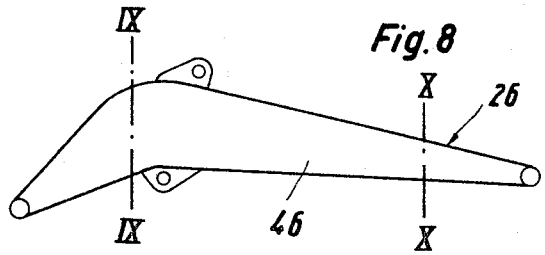
Fig. 8
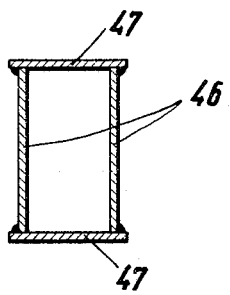 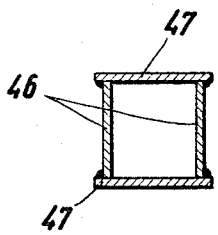
Fig. 9    Fig. 10

3,275,163
HYDRAULICALLY OPERATED DEEP DREDGER SHOVEL FOR MOUNTING ON SUPPORT VEHICLES
Hans Schaeff, Langenburg, Wurttemberg, Germany, assignor to Firma Karl Schaeff KG., Maschinenfabrik, Langenburg, Wurttemberg, Germany
Filed Dec. 16, 1964, Ser. No. 418,739
Claims priority, application Germany, Dec. 18, 1963, Sch 34,344, Sch 34,345
5 Claims. (Cl. 212—145)

This invention relates to hydraulically operated deep dredger shovels for mounting on support vehicles and is concerned more particularly with a dredger mechanism provided with a support frame which may be suspended from the support vehicle and has lateral support posts that may be extended into contact with the ground for additionally supporting the mounted apparatus. On the support frame a displaceable carriage may be mounted to which the drive for the lateral swinging movement, as well as the boom for actuating the dredger shovel, together with the shovel arm, and the associated work cylinders are connected.

The known hydraulically driven, mounted or hitched apparatus of this type are usually connected to a hydraulic installation contained in the support vehicle and consisting of a pump, an oil tank, a filter and flow control devices. As the working pressure and the feeding power of the hydraulic installation are designed for one or for only a few predetermined mounted apparatus, it is difficult to exchange or employ different support vehicles for the same mounted apparatus, and in many instances such an exchange is not possible at all.

It is therefore an object of the invention to avoid these disadvantages, especially in moving earth in quantities which, as a rule, do not warrant the use or the purchase of heavy equipment. The object of the invention is thus to provide a mounted dredger adapted to the dimensions of smaller conventional vehicles provided with a power take-off shaft, for example to a farm tractor, having no hydraulic installation and affording a simple coupling connection to this vehicle.

It is another object of the invention to improve the mounted apparatus of this type in such a way that by suitable arrangement of the working cylinders and proper design of the individual parts the forces introduced over the working cylinders are transferred as directly as possible to the elements to be actuated, to thereby obtain a saving of material and weight, as well as lowering production costs during manufacture.

It is another object of the invention to provide a mounted apparatus of this type which may be easily coupled to a vehicle and which has a large working range without requiring a movement of the support vehicle itself and which, in view of the required amount of hydraulic oil, is largely independent of the hydraulic installation available on the vehicle. The individual structural parts are to be made of a simple and inexpensive welded construction, but so as to be fully equal to the working requirements.

An embodiment of the deep dredging shovel of the invention is characterized in that the width of the main frame or of the dredger base is smaller than the distance between the rear wheels of the support vehicle, and that for the connection in a three point suspension or a similar mounting arrangement, the frame is provided with screw bolts, and includes a hydraulic pump driven by the power take-off shaft. Directly above the hydraulic pump and oil tank, an oil filter as well as flow control devices are arranged. With these parts the dredger may be connected to any available vehicle, independently of whether this support vehicle has a hydraulic installation or not.

According to a further embodiment which is particularly suitable for larger requirements and for larger earth moving operations the frame consists of an upper and a lower elongated cross beam of rectangular hollow profile as well as of two U-shaped side struts connecting the two cross beams. In the U-shaped side struts the piston rod of the support post for the dredger apparatus extends axially but is laterally movable, and the associated cylinder is slidably guided in openings of transverse plates secured to the U-shaped struts.

It is a further feature of this invention that the frame supports the carriage which is displaceably mounted on the front surfaces of the cross beams on whose upper side the oscillating drive for a bearing plate is arranged, which is secured at one end to the upper pivot shaft and on the other end as bearing for the boom.

The invention will be described in greater detail hereafter by means of two embodiments illustrated in the accompanying drawings in which:

FIGURE 1b shows a perspective view of the general construction of the attachment device.

FIGURES 1c and 1d show diagrammatically in enlarged form a plan view of the drive device showing the lateral swing-movement of the beam wherein FIGURE 1c shows the beam perpendicular to the frame and FIGURE 1d shows the beam rotated parallel to the frame.

FIGURE 2 is a front view of the mounting frame of the apparatus according to FIGURE 1, with the carriage removed.

FIGURE 4 is a cross-section through the mounting frame along line IV—IV of FIGURE 2 wherein the tubular oil cooler and a suspension device for connection to the vehicle are illustrated.

FIGURE 5 is a side view of the boom.

FIGURE 6 is an enlarged cross-section through the boom along line VI—VI of FIGURE 5.

FIGURE 7 is another cross-section through the boom along line VII—VII of FIGURE 5.

FIGURE 8 is a side view of the shovel arm.

FIGURE 9 is a slightly enlarged cross-section through the box profile of the shovel arm along line IX—IX of FIGURE 8.

FIGURE 10 is a further cross-section along line X—X of FIGURE 8.

Figure 1A:
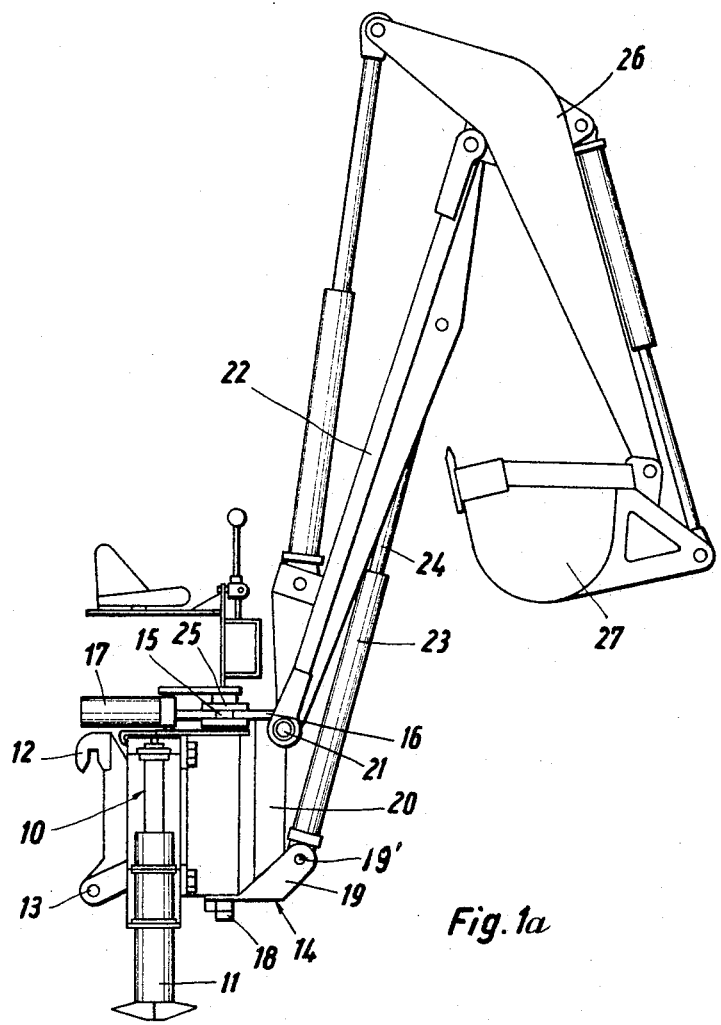
FIGURE 1a is a side view of a mounted dredger apparatus according to the invention.
Figure 12:
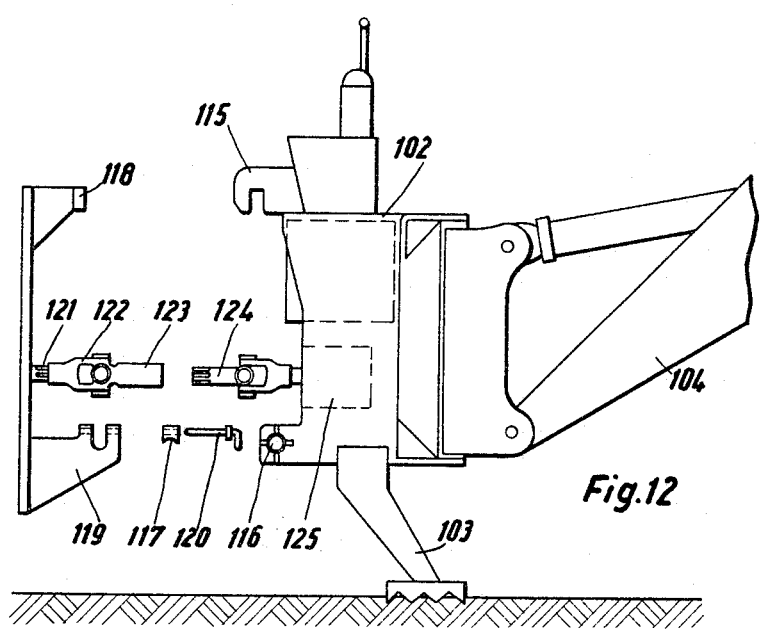
FIGURE 12 is a side view of the mounting frame with the fastening and driving elements of the support vehicle.

The attachment device mounted on a carrier vehicle (not shown) comprises a frame 10 which is composed of an upper and lower horizontal box profiles 28 and two perpendicular, lateral U-shaped profiles 29. At the rear side of the frame 10, upper hooks 12 as well as a subjacent horizontal shaft 13, are provided by means of which the attachment device is secured to the carrier vehicle as seen in FIGURE 12. At the side remote from the vehicle a bearing slide 14 is mounted with a plate 14a on the upper box profile 28 of the frame enclosing it and holding the slide 14 to the frame during its transverse movement. A perpendicular pivot shaft 15 fixed to the upper horizontal plate 14a of the slide supports a horizontal plate 16 (see FIGURES 1c and 1d) which is enlarged at the forward end forming the bearing head. At its rear end the plate 16 is connected with the drive for the lateral pivotal movement of the beam. The drive for the lateral pivotal movement of plate 16 or of the beam is shown in detail in FIGURES 1c and 1d.

The pivot drive consists of two hydraulically operated cylinders 17 which are pivotally mounted at their front end around a vertical shaft 17a on the horizontal plate 14a of the bearing slide 14. The shaft 17a of the hydraulic cylinder 17, as well as the pivot shafts 15 for the plate 16 which are all attached at their lower end to the plate 14a, are supported at their upper end in another plate 14b shown in FIGURE 1a. The piston rods 17b of the hydraulic cylinder 17 are pivotally connected at 17a to a plate 25 which, in turn, is pivotally connected at 25b to the pivot plate 16 on the beam. In this manner a pivotal drive is provided for the beam with very simple means, and the beam is pivotable toward both sides a full 90° from its center position.

At the bottom side of the carriage 14 a lower pivot shaft 18 is disposed which is aligned with the upper pivot shaft 15. On the lower pivot shaft 18 a lower plate 19 is mounted which is rigidly connected over a vertical bracing box 20 to the upper plate 16. The upper plate 16 receives in its enlarged front end the pivot shaft 21 of the boom 22 while in the lower plate 19 a shaft 19' is secured for allowing the pivotal connection of the working cylinder 23 for the boom 22. The piston rod 24 of the working cylinder 23 is pivotally connected to the boom at its outer end. From the above described arrangement it may be seen that the forces of the oscillating drive 17 are transmitted over the shortest possible way through connection straps 25 to the upper plate 16 and thus to the bolt 22. For this reason a heavy rotary column usual in the known constructions may be eliminated. The rotary column consists in the present construction of the bracing box 20 which due to its connection to the upper and lower plates 16 and 19 is spaced sufficiently far from the pivot axis to provide an oscillating range which is as large as possible, in this case 180°. A further advantage of the upper connection of the boom 22 and of the lower connection of the working cylinder 23 it is to be noted that for lifting a load with the shovel 27 fixed to the shovel arm 26 the entire piston surface in work cylinder 23 is available.

Contrary to the known constructions the mounting frame itself is used according to the invention as support or as guide for the laterally displaceable carriage so that aside from the already light hollow profile construction further weight savings are obtained by eliminating a special carriage guide. The multiple engagement of the slide carriage 14 at the mounting frame 10 is especially favorable in view of the rough operations, as well as soiling and corrosion to which this type of apparatus is exposed. For a lateral displacement of the carriage 14 it is necessary to loosen a few screws 14c, shown in FIGURE 4 which are screwed into corresponding threaded bores on the front side of the mounting frame 10 (see FIGURE 2), while the upper vertically secured screws 14d serve as clamping screws.

In FIGURE 2 the mounting frame 10 is shown with the carriage 14 removed. The frame 10 consists of 2 cross-beams 28 having a rectangular hollow profile and of two U-shaped side struts 29 whose open side is directed outwardly. The profiles are welded together and provide an inner space inside the frame in which an auxiliary oil tank 30 may be disposed. This oil tank 30 consists appropriately of thin-walled tubes so that the circulating oil may be cooled in these tubes and may be increased substantially in volume due to this tank volume. Due to the welded hollow profile construction the mounting frame 10 is particularly light and strong against twisting stress. If necessary, additional cross braces may be provided between the cross-beams 28.

Figure 3:
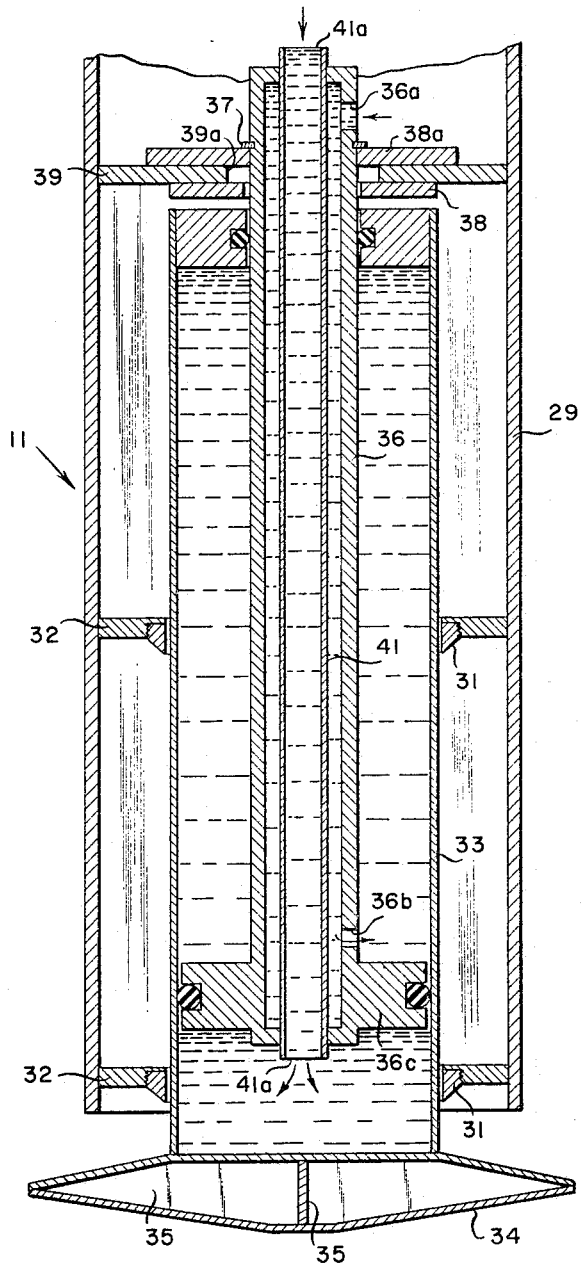
FIGURE 3 is a cross-section through a side of the frame and the support post received therein along line III—III of FIGURE 2.

The U-shaped profile of the frame side struts 29 (FIGURES 2, 3 and 4) serves to receive exchangeable guide rings 31 for the support posts 11. The guide rings 31 are mounted in transversely extending plates 32 inserted in the U-shaped profile and serve as slide bearing for the extendable cylinder 33 which is provided at its lower end with a conical base plate 34 from which two downwardly directed mutually crossing transverse webs 35 project. Due to this conical form the earth cannot be displaced laterally very easily when the posts are extended, but on the other hand the transverse webs 35 aid in transferring the supporting force in the case of an uneven, hard ground, centrally to the support posts.

In the U-shaped piece 29 of the frame, which is open to the side, a cross plate 39 is welded at the top and it is provided with a central opening 39a. The U-shape of the side parts 29 serves also to receive the exchangeable guide rings 31 for the hydraulic cylinder 33 acting as the support leg. For retaining the guide rings 31, several cross plates 32 welded to the U-shaped member are provided in which corresponding openings are made and into which the guide rings may be secured, for example, by screw threading. The guide rings 31 serve as a sliding guide for the hydraulic cylinder and may be screwed into the cross plates and have means for adjusting the slide guide. Because the cylinder 33 serves as the support leg and is movable, the piston rod 36 must be secured or stationary. This is accomplished by means of a lower flange 38 welded to the piston rod and abutting against the cross plate 39 at the lower end and with an upper flange 38a which is removable from the piston rod 36. It is further secured to it by means of a clamping ring 37 to prohibit upward sliding so that the flanges 38 and 38a hinder the piston rod 36 at the cross plate 39 in its vertical movement. The opening 39a of the cross plate 39 has a larger diameter than that of the piston rod 36 so that with the arising of bending forces, the piston rod may follow these forces or may avoid them and does not become bent.

The lower flange 38 has a larger diameter than the cylinder 33, so that in case a raising of the device becomes necessary, the entire support leg consisting of the piston and cylinder (after releasing the upper flange 38) may be pulled out through the guide rings 31 downward relative to the frame.

The piston rod 36 is made hollow and contains a tube 41. The tube 41 and the circular space formed by the tube in the piston rod represent two hydraulic guides for the double acting cylinder 33 wherein at the upper end of the piston rod and the tube, two separate inlets 36a or 41a are provided. The circular space leads through a corresponding opening 36b to the other side of the piston 36c and the tube through an opening 41b to the other side of the piston into a cylinder chamber.

The cylinder 33, serving as support leg 11, carries at the lower end thereof a cone-shaped base plate 34 from which downwardly two vertical cross plates 35 project as discussed above. Due to the conical form, the earth is not so easily pushed away when the legs are moved out while the cross plates 35 assist in that the forces from hard ground are transmitted centrally to the support leg.

The FIGURES 5, 6 and 7 show a particularly light weight and simple construction for the boom. The upper side of the boom 22 consists of a continuous U-shaped profile 410 upon whose downwardly directed flanges 42 a U-shaped piece 43 of somewhat wider profile is welded so that the top portion forms a continuous closed box support which, as is known, absorbs twisting forces most effectively when as in the present case the support straps 44 and 45 are directly welded to the hollow box. FIGURE 7 shows a cross-section at the point where the piston rod of the work cylinder for the boom is connected.

The shovel arm 26 which is subjected primarily to bending stresses is illustrated in FIGURES 8–10. It consists of a welded box construction which is composed of side plates 46 and of cover plates 47. The side plates 46 are of different height throughout their length and are adapted to the bending stresses acting upon the shovel arm. The hollow box absorbs also twisting forces based on excentric power stresses at the shovel 27. The tension at the edge of the shovel arm is reduced by means of the cover plates so that the tension present in the material due to welding and forming of the side plates are not increased by the exterior forces of the shovel arm and the work cylinder. For this purpose the cover plates are welded in an overlapping manner on the end faces of the side plates.

Figure 11:
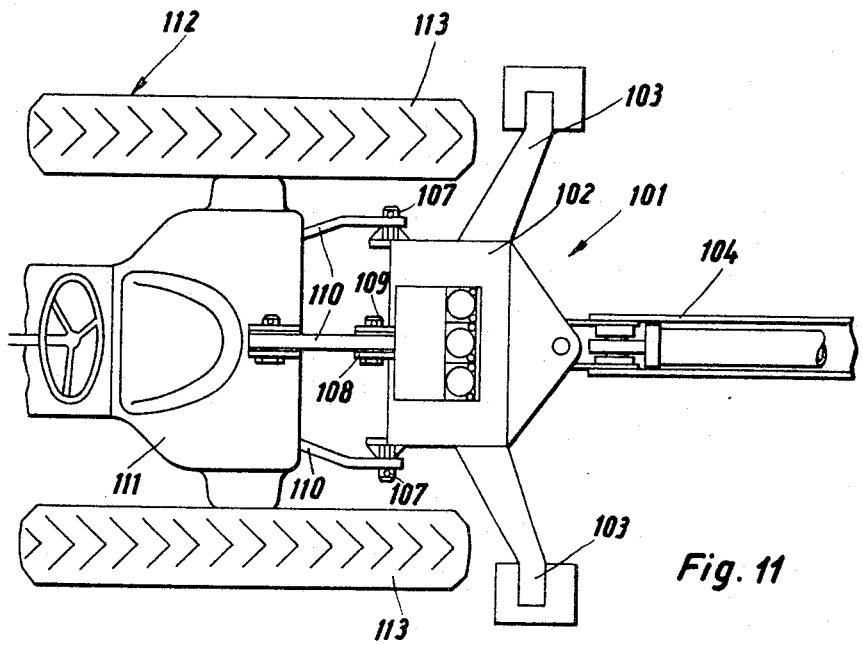
FIGURE 11 is a plan view of a deep dredger shovel according to a second embodiment of the invention mounted on a farm tractor.

FIGURE 11 shows in plan view the mounted dredging shovel 101 according to the invention in a second embodiment having a main frame 102, support feet 103 and a boom 104. At the main frame are connected in this example two lateral bolts 107 as well as a central bolt 109, over a guide member 108. These bolts serve to secure a three point suspension arrangement consisting of 3 individually movable rods 110 which are pivotally connected to the drive base 111 of the tractor 112, and which may be actuated over suitable mechanical or hydraulic driving means. From FIGURE 11 may be seen that the width of the main frame 102 is of a size such that it may be easily received between the space between the two large driving wheels 113, and be connected to the mounting connections that may be available.

In place of the three point suspension of a tractor allowing the mounting arrangement illustrated in FIGURE 11 the frame 102 of the dredging shovel may be provided in a rigid connection according to FIGURE 12 with one or more upper hooks 115 and with a lower horizontally extending shaft 116 which are directed from the rear side of the frame toward the vehicle. In that case are provided on the support vehicle at a corresponding level upper straps or counter-hooks 118 or a horizontal shaft, while the lower shaft 116 fixed to the main frame 102 is received in bearing brackets 119 which are rigidly connected to the support vehicle. For securing the mounting apparatus in the connected position fastening pins or bolts 120 may be employed in a conventional manner.

In order to journal the shaft 116 or corresponding shaft ends in the bearing brackets 119 more tightly and more securely, it is possible to use intermediate bearing pieces 117 which are slipped over the shaft ends 116 and which, inside the bearing brackets 119, closely engage the securing elements 120 on the outside. The intermediate pieces 117 have the purpose of distributing the forces transmitted from the mounting apparatus to the bearing brackets 119 of the tractor 112 uniformly to the securing elements 120. For this purpose they may be cylindrical on the inside for receiving the shaft and may have on the outside another form suitable for further transfer of the forces to the bearing brackets 119 or to the safety elements 120 so that the safety elements do not become deformed during the stresses which arise. With a corresponding form of the bearing brackets 119 the intermediate pieces 117 may consist of bearing cups or slotted bearing sleeves surrounding the shaft halfway or more.

The working connection between the support vehicle and the mounted apparatus consists of the power take-off shaft 21 of the support vehicle on whose profile a hollow shaft 122 with corresponding inner profile is slipped until the additional sleeve 123 universally connected thereto may also be slipped on the also universally coupled take-off shaft 124 of the pump 125 received in the main frame.

Figure 13:
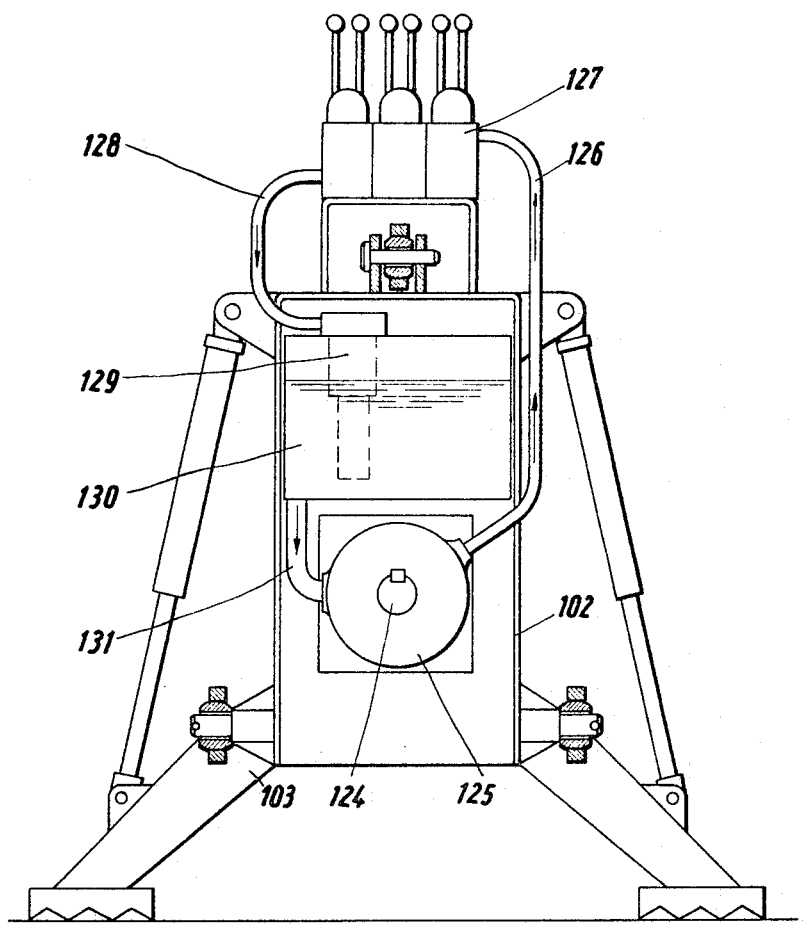
FIGURE 13 is a front view of the mounted dredger according to the second embodiment, seen from the driving side.

The structure of the main frame and of the hydraulic assembly mounted in this frame is illustrated in FIGURE 13. The drawing shows a hydraulic pump 125 which is driven through the take-off shaft 124 of the support vehicle. The higher placed control members 127 are actuated over pressure lines 126 and thereby the boom 104 and the support feet are operated. The excess oil and the oil discharged from the work cylinders flows through the control members 127 and the return flow line 128 into an oil filter 129 and from there into a storage tank 130 which is located directly above the pump 125. The pump is designed for operation at the speed of rotation of the take-off shaft and is connected, as a most appropriate arrangement, over a short line 131 with the storage tank. As the pump is directly carried on the mounted apparatus the necessary lines to the control members are also shorter and the degree of effectiveness is improved. A further advantage of this arrangement consists in the fact that in the case where a pump is lacking, the usual type of pipe couplings, valve members and additional safety valves may be eliminated on the mounted apparatus. Because of the compact arrangement of the pump and the storage tank there is a particularly short oil circulation in the neutral position of the control members which causes also a reduction of the output losses.

The connection and disconnection of the deep dredging shovel on a support vehicle having a take-off shaft and a three point suspension or some other suitable suspension is carried out in such a way that over the telescopic universal joint shaft the hydraulic pump is connected to the take-off shaft. In view of the hydraulic installation disposed in the mounted apparatus a particularly easy mounting of the mounted apparatus on a support vehicle with rigid connecting points is assured, because after a connection of the take-off shaft drive the dredging apparatus may be easily brought into the position of the suspension elements by actuating the built-in hydraulic support feet 103 without requiring additional means.

Due to the construction of the mounted apparatus according to the invention it is obtained that the center of gravity of the apparatus is located very close to the support vehicle and assures a favorable operating position.

What is claimed is:
1. A hydraulic deep bucket dredger for attachment to a carrier vehicle comprising:
   (a) a frame adapted to be attached to the carrier vehicle,
   (b) lateral, downwardly extending support legs,
   (c) a slide carriage transversely slidable on said frame,
   (d) said frame including an upper and a lower horizontal hollow member, and a pair of substantially vertical members,
   (e) said frame having at least one hook on said upper member and a connecting shaft on said lower member for attachment to the carrier vehicle,
   (f) an oil container positioned in said frame,
   (g) said support legs including hydraulic cylinders positioned and slidably mounted in said vertical members,
   (h) said hydraulic cylinders including piston rods secured to said vertical members and held against axial movement,
   (i) said slidable carriage having a pivoting plate and a pivot drive mounted thereon, said pivot drive connected to said pivoting plate for rotation thereof,
   (j) a boom operatively connected to said pivot plate.
2. A dredger as defined in claim 1 wherein said vertical member includes an upper cross plate having an opening the diameter of which is larger than the diameter of said piston rod, said piston rod further having a pair of flanges releasably secured adjacent said cross plate, said vertical members also including exchangeable guide rings adjacent said cylinders.
3. A dredger as defined in claim 1 wherein said stationary piston rod is hollow and includes a tube positioned therein providing a path for the fluid flow in said cylinders.

4. A dredger as defined in claim 1 wherein said pivoting plate is connected to a rigid vertical member, said rigid vertical member being connected to a lower bearing plate mounted on said slidable carriage, said pivot drive including a pair of hydraulic cylinders rotating said pivoting plate.

5. A dredger as defined in claim 1 wherein said boom is a hollow box-shaped member and has a U-shaped projection depending therefrom.

References Cited by the Examiner
UNITED STATES PATENTS

| | | | |
|---|---|---|---|
| 1,974,458 | 9/1934 | Hallquist | 214—145 |
| 2,610,754 | 9/1952 | Inskeep | 214—145 |
| 3,033,380 | 5/1962 | Dorkins | 212—67 |
| 3,079,009 | 2/1963 | Davis | 212—145 |
| 3,117,685 | 1/1964 | Davis | 214—138 |
| 3,155,250 | 11/1964 | French et al. | 214—138 |

HUGO O. SCHULZ, *Primary Examiner.*